United States Patent [19]
Woods et al.

[11] Patent Number: 5,152,364
[45] Date of Patent: Oct. 6, 1992

[54] TRACTOR CONFIGURATION AND COMPONENT MOUNTING ARRANGEMENT FOR HIGH VISIBILITY, MANEUVERABILITY, AND SERVICEABILITY

[75] Inventors: Terrill W. Woods; Lyle R. Madson, Cedar Falls, both of Iowa

[73] Assignee: Deere & Company, Moline, Ill.

[21] Appl. No.: 666,755

[22] Filed: Mar. 8, 1991

[51] Int. Cl.⁵ .............................................. B60K 5/02
[52] U.S. Cl. .................... 180/292; 180/69.1; 180/89.12; 180/312; 180/900; 296/198; D15/15; D15/23
[58] Field of Search .............. 180/291, 292, 299, 312, 180/900, 908, 68.1, 68.4, 68.5; 69.1, 89.12, 79, 79.3, 252, 374; 296/198; D15/15, 23

[56] References Cited

U.S. PATENT DOCUMENTS

| | | | |
|---|---|---|---|
| D. 256,801 | 9/1980 | Skyer et al. | D15/23 X |
| D. 298,433 | 11/1988 | Mikado et al. | D15/23 |
| D. 301,039 | 5/1989 | Funabashi et al. | D15/23 |
| D. 305,236 | 12/1989 | Funabashi et al. | D15/23 |
| 2,296,205 | 9/1942 | Johnson | 180/900 X |
| 4,223,899 | 9/1980 | Krieger | 180/900 X |
| 4,368,797 | 1/1983 | Van der Lely | 180/900 X |
| 4,506,756 | 3/1985 | Bergous | 180/69.1 X |
| 4,523,656 | 6/1985 | Van der Lely | 180/900 X |

FOREIGN PATENT DOCUMENTS

| | | | |
|---|---|---|---|
| 1149254 | 5/1963 | Fed. Rep. of Germany | 180/900 |
| 3046054 | 6/1982 | Fed. Rep. of Germany | 180/900 |
| 3308502 | 9/1984 | Fed. Rep. of Germany | 180/89.12 |
| 0270232 | 11/1988 | Japan | 180/900 |
| 2114072 | 8/1983 | United Kingdom | 180/69.1 |

OTHER PUBLICATIONS

Owner's Manual, John Deere 4020 Row Crop Tractor, pp. 2-3, pub. date unknown.
Ferdt Brochure, "Porte-Outils 4RM-365 GTA, 380 GTA, 380 GHA", pp. 1-20, pub., date unknown.
John Deere Tractor Sales Brochure, "Firepower: 105-200-HP Tractors", pp. 1-40, pub. date unknown.

*Primary Examiner*—Andres Kashnikow
*Assistant Examiner*—Brian L. Johnson

[57] ABSTRACT

A work vehicle configuration has the engine directly over the front axle, the cooling system radiator far enough forward to allow even large tires to turn into the volume defined between the radiator and the engine, and a tall but very narrow transmission forward of the operator enclosure. This allows the vehicle to be provided with a wasp-waist, significantly improving visibility. This also allows a recessed area in the vehicle body adjacent to the front tires, allowing a sharper turning radius and improved maneuverability. This placement of the transmission frees space under the operator enclosure, allowing use of a significantly larger fuel tank. Finally, the placement of the main vehicle components away from the front tires and out from under the operator enclosure allows improved access and serviceability for the tractor.

9 Claims, 4 Drawing Sheets

TRACTOR CONFIGURATION AND COMPONENT MOUNTING ARRANGEMENT FOR HIGH VISIBILITY, MANEUVERABILITY, AND SERVICEABILITY

BACKGROUND OF THE INVENTION

1. Field of the Invention

The present invention relates to work vehicles, and in particular to agricultural tractors and the overall configuration thereof.

2. Description of the Related Art

Planting, cultivating and many other current crop-growing practices require extreme precision in maneuverability, which makes visibility a critical function. Making the way around farmsteads, and narrow-row farming also require excellent maneuverability.

Tractors with mechanical front wheel drive (MFWD) and very large front tires suffer from poor maneuverability. This has been exacerbated by the trend to ever closer tire spacing, e.g., for 30 inch rows, which is possible with the adjustable spacing of tires on most current tractors. In addition, visibility inside the front tires of tractors has steadily decreased since the John Deere 4020 tractor went out of production in the early 1970s. Finally, serviceability of tractors has been lost over the years due to added complexity from operator enclosures, MFWD, air conditioning, and the like. All current major manufacturers' designs have these problems.

SUMMARY OF THE INVENTION

It is the object of the present invention to provide a new tractor configuration which significantly improves visibility, maneuverability, and serviceability for row-crop tractors and other types of work vehicles.

This object is achieved with a new tractor configuration which places the engine directly over the front axle and places the cooling system far enough forward of the engine to allow even closely spaced large tires to turn into the space between the cooling system and the engine. To further enhance maneuverability, the tractor preferably is provided with a recessed area adjacent to each of the front tires, so that the front tires can actually turn inside of what traditionally would have been part of the tractor body.

The configuration uses a tall, but narrow, transmission just forward of the operator enclosure for ease of serviceability and excellent visibility. This also leaves the area under the operator enclosure free of the traditional transmission housings and the like, so that a 50% larger fuel tank can be placed in a convenient location.

Preferably, a structural oil pan is used instead of a frame to hold the various components in the positions described. In addition to the advantage of reducing the number of parts, such an oil pan can be quite narrow in the vicinity of the wheels, further enhancing visibility and maneuverability.

The proposed tractor configuration has many advantages. First, it provides visibility inside the front tires, even when they are closely spaced for narrow rows, a feature that has been missing since the John Deere 4020 tractor went out of production. It also provides excellent maneuverability on tractors with MFWD and very large tires set to operate in narrow rows. This configuration provides a 20% improvement over the best in class today, which are the John Deere 55 Series row-crop tractors.

Due to the improved access provided by this configuration, daily servicing will be reduced approximately 30% compared to the John Deere 55 Series row-crop tractors. Similarly, the repair and reconditioning times for engines and transmissions also will be improved, by approximately 40% and 60%, respectively.

DETAILED DESCRIPTION OF THE PREFERRED EMBODIMENT

Figure 1:
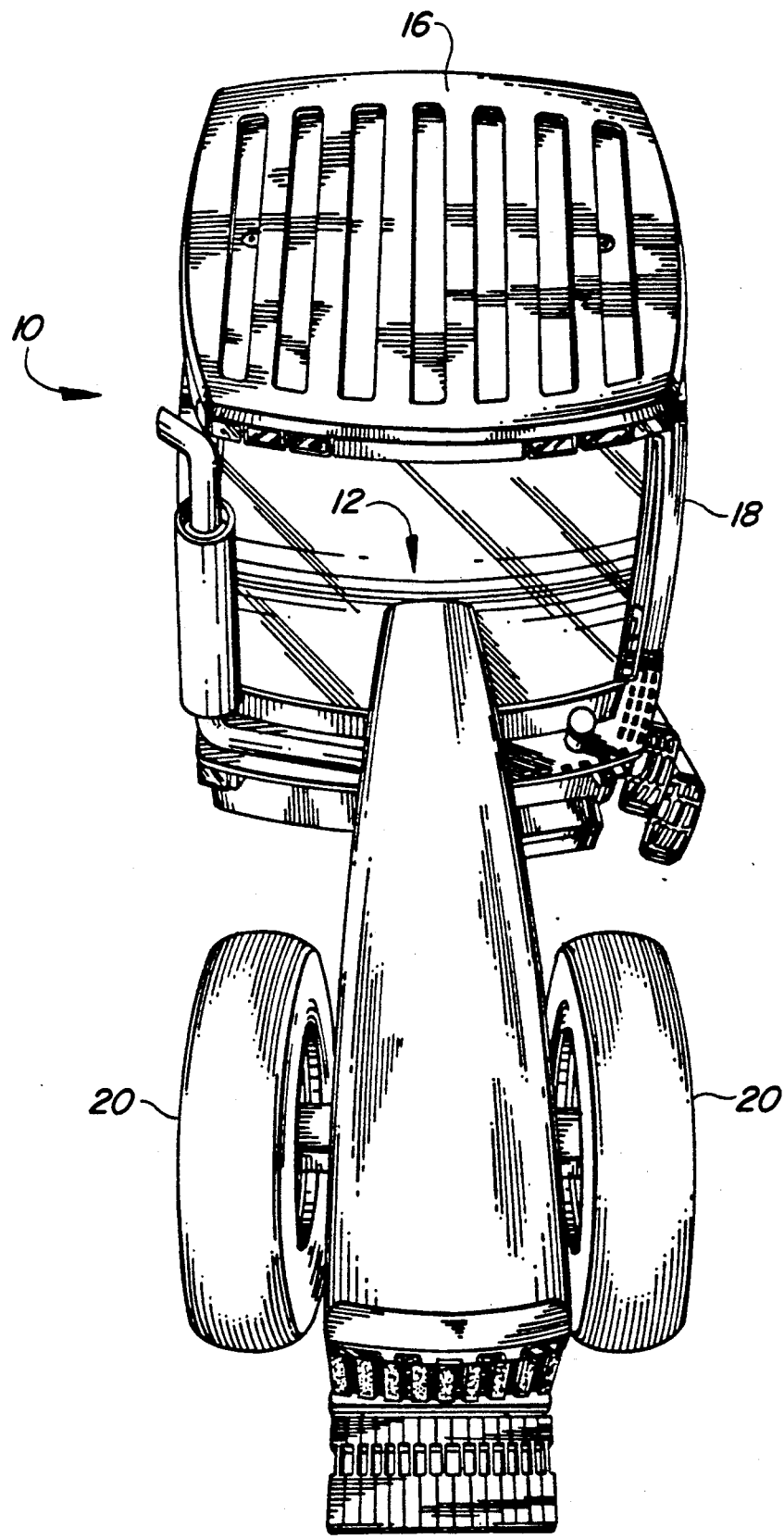
FIG. 1 is an elevated front perspective view of a tractor according to the present invention.
Figure 2:
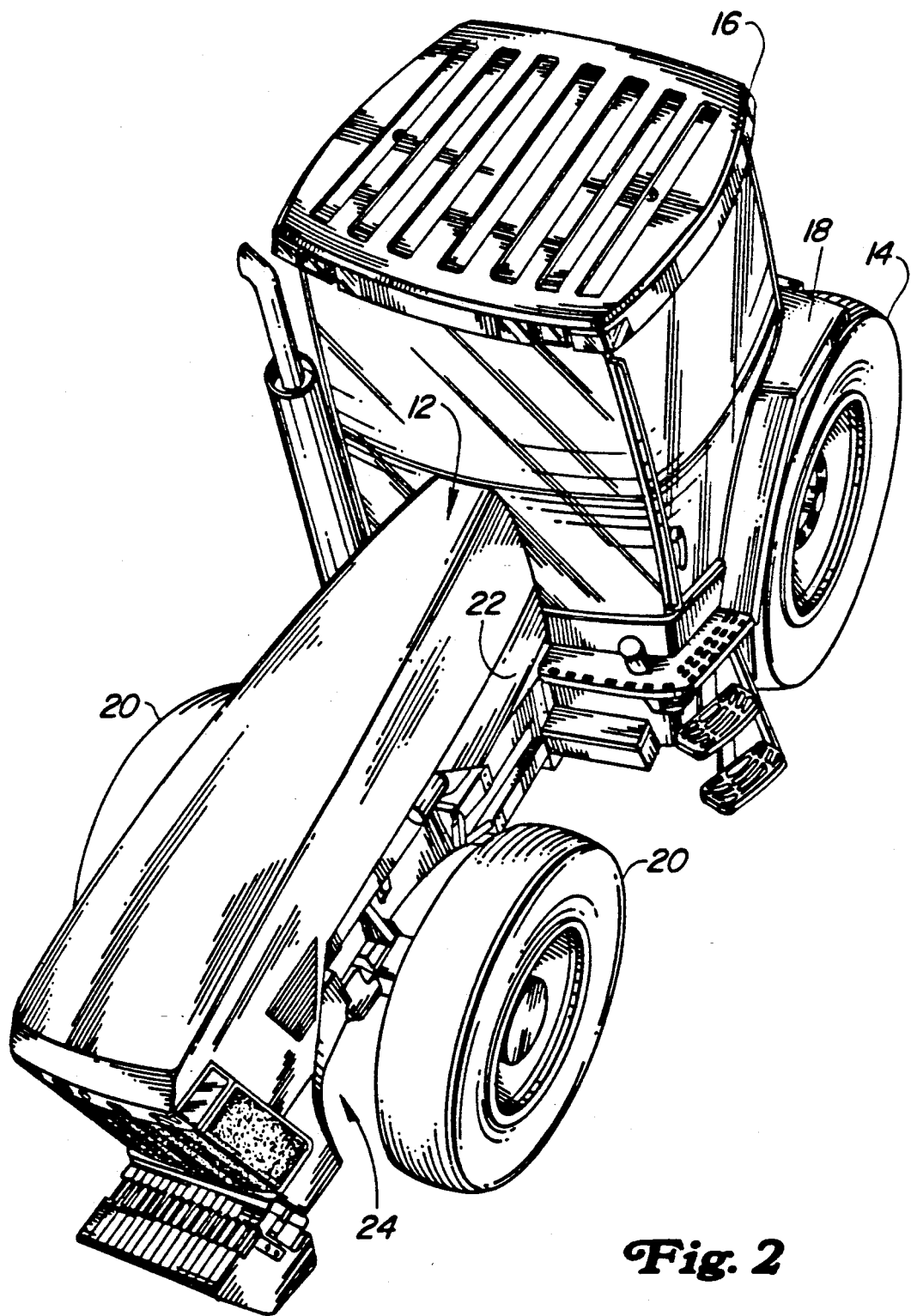
FIG. 2 is an elevated three-quarter perspective view of the tractor of FIG. 1.

FIGS. 1 and 2 illustrate a tractor 10 according to the present invention. At first glance, two aspects of this tractor are strikingly different from conventional tractors: First, the tractor has a very narrow, wasp-waist 12. Second, the rear tires 14 are not visible in the straight-on view of FIG. 1.

The rear tires 14 are not visible in FIG. 1 due to a combination of their narrow spacing and the width of the operator enclosure or cab 16 and fenders 18. The rear tires 14 would be visible in FIG. 1 if they were set at a wider spacing, or if the cab 16 and/or fenders 18 were narrower.

The wasp-waist 12 is what allows the high visibility inside the front tires 20 of the present tractor. Not only does the hood line of the tractor narrow from the front towards the cab, but even at the cab, the bottom portion 22 of the hood narrows further to ensure maximum visibility inside the front tires 20.

Improved maneuverability of the tractor is provided by the recessed area shown generally at 24. This area is sufficiently narrow that the front tires 20 can actually turn into it underneath the upper portion of the tractor, allowing a very tight turning radius.

Figure 3:
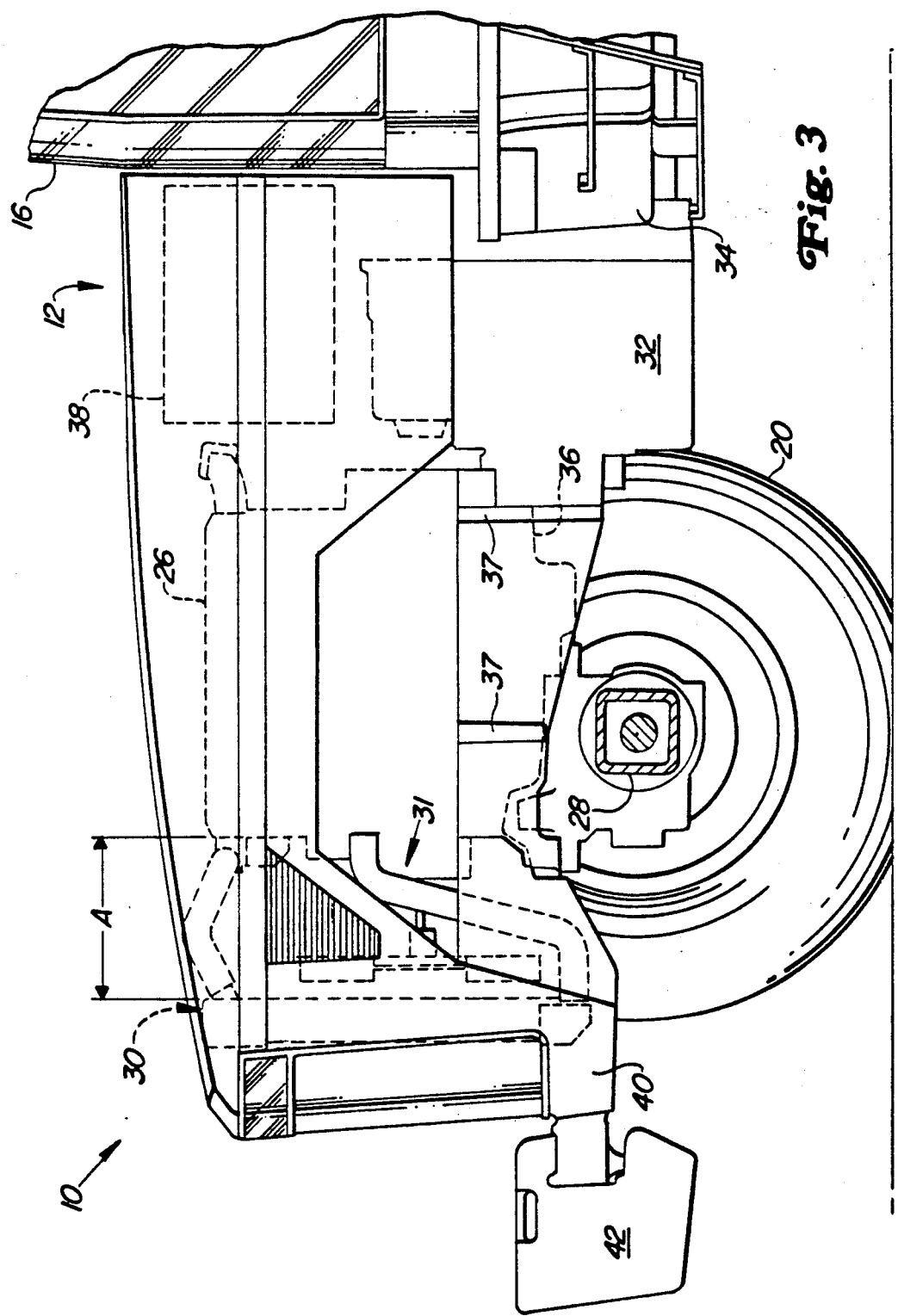
FIG. 3 is a side view in partial section of the tractor of FIG. 1, showing the placement of various components within the tractor.
Figure 4:
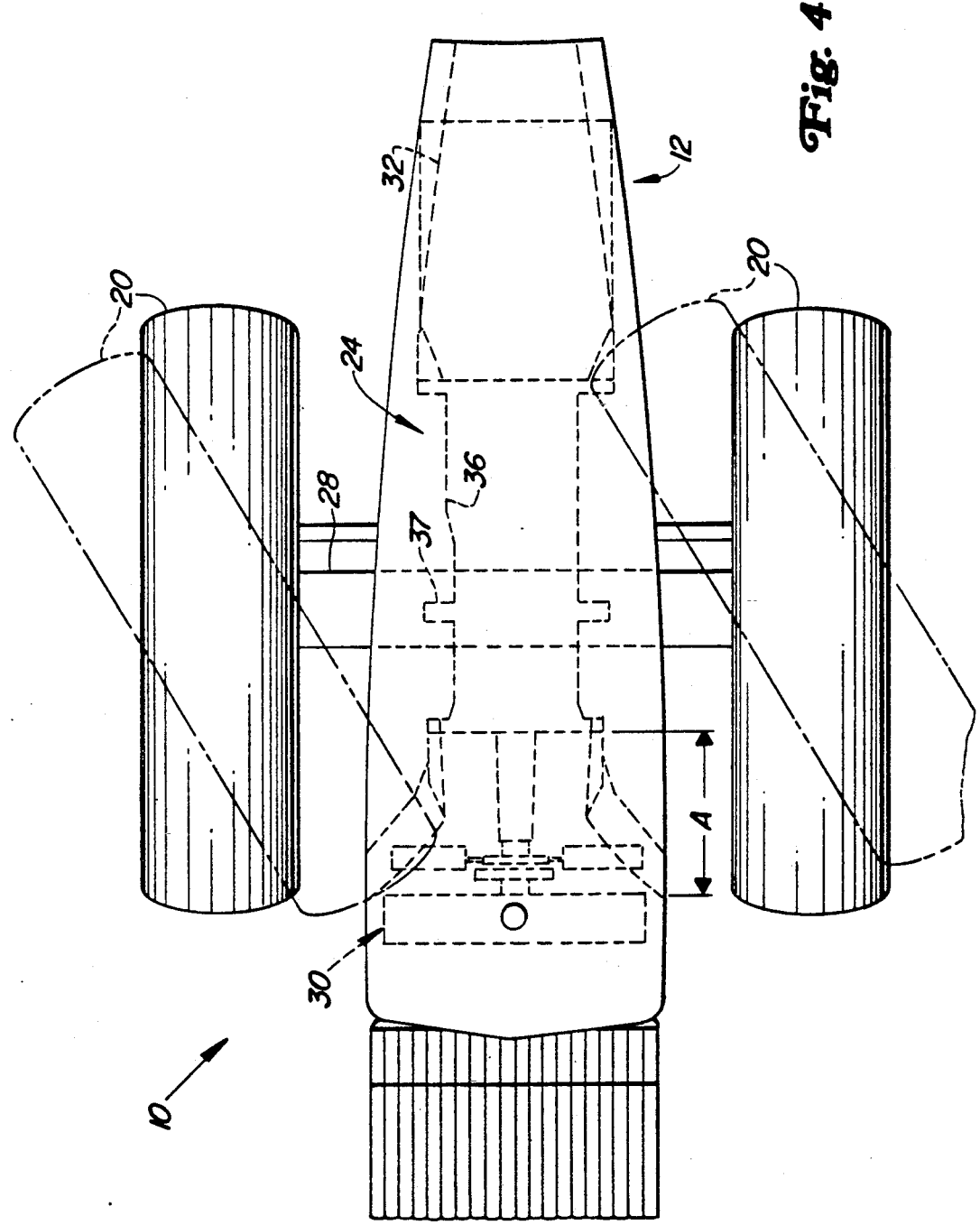
FIG. 4 is a top view in partial section of the tractor in FIG. 1, showing the placement of various components in the tractor and the turning positions of the front tires of the tractor.

The internal arrangement of components which allows the wasp-waist 12 and the recessed area 24 are illustrated in FIGS. 3 and 4. The engine 26 is placed above the front axle 28. The radiators, fans and other portions of the cooling system 30 are spaced considerably away from the engine 26. This contrasts markedly with the traditional design, in which the cooling system is placed immediately adjacent to the engine.

This positioning of the cooling system 30 provides a volume or space A into which the front end of the front tires 20 can move during turning, as shown in phantom in FIG. 4. It is most important for the lower portion of this space A to be open. The upper portion may contain various components, e.g., hoses to connect the cooling system, generators or the like, shown generally at 31, without interfering with the front tires 20, since the upper parts of the tires 20 are further out from the center line of the tractor due to the curved perimeter of the tires.

Among other things, placing the engine 26 above the front axle 28 moves it above and forward of the traditional position. This provides space to position a tall, but narrow transmission 32 between the engine 26 and the cab 16. Again, this contrasts with the traditional tractor design in which the transmission is placed under the cab. This provides additional open space under the cab 16, so that a larger fuel tank 34 may be accommodated under the cab.

The engine 26, cooling system 30 and transmission 32 could be held in an appropriate position relative to one another by use of a suitable frame or the like. However, a further aspect of the invention uses a structural oil pan 36 instead of a frame. This oil pan 36 acts in the normal fashion as the oil pan for the engine 26. However, it is formed of unusually heavy materials, e.g., cast-iron, and provided with suitable reinforcement ribs 37 so that it can bear the weight of the various components. This has the advantage that the oil pan can be made quite narrow, allowing ample space in the recessed area 24. This structure also can elevate the engine well above the recessed area 24.

With this structure, the oil pan 36 is mounted to the housing for the front axle 28. The engine then is mounted on top of the oil pan 36, the cooling system 30 is mounted either directly or by brackets to the front of the oil pan 36, and the housing for the transmission 32 is mounted to the back of the oil pan 36.

Preferably, the rear portion of the oil pan 36 and the bottom front part of the transmission 32 are particularly narrow, so that the recessed area 24 extends underneath them. This will allow the rear edges of the front tires 20 to fit underneath this part of the tractor body, as shown in phantom in FIG. 4.

As best seen in FIG. 3, the design shown leaves a large empty space 38 above the transmission 32 and behind the engine 26. This space may conveniently be used to hold batteries, air conditioning, heating equipment and the like.

The net effect of the configuration described is to place the main components which need servicing, e.g., the engine 26, the cooling system 30 and the transmission 32, well away from the front tires 20 and out from under the cab 16. This, in turn, means that these components are more accessible, significantly improving serviceability of the tractor.

It should be noted that one effect of this configuration is to lengthen the front portion 40 of the tractor extending beyond the front axle 28. One consequence of this is that care should be taken in shaping of the front portion 40, as well as any front end weights 42 which may be attached to the tractor, to be sure that there is sufficient clearance when driving through a ditch or swale.

While the present invention has been described in conjunction with a specific embodiment, it is understood that many alternatives, modifications and variations will be apparent to those skilled in the art in light of the foregoing description. For example, the configuration has been described with respect to a row-crop tractor, but could easily be used with any of a variety of work vehicles, including non-agricultural work vehicles. Accordingly, this invention is intended to embrace all such alternatives, modifications and variations which fall within the spirit and scope of the appended claims.

We claim:

1. A work vehicle comprising:
  a. an axle having steerable tires at either end thereof;
  b. an engine;
  c. a cooling system interconnected with said engine to cool said engine and having at least one radiator; and
  d. positioning means for mounting said engine above said axle of said work vehicle and mounting said radiator, said engine and said axle in a spaced relationship relative to one another such that there is a volume define between the top, bottom, and side outer surfaces of both said radiator and said engine into which a portion of said tires can pivotally enter during steering.

2. The work vehicle of claim 1, further comprising an operator enclosure and a transmission, wherein said positioning means further serves to mount said transmission between said engine and said operator enclosure of said work vehicle.

3. The work vehicle of claim 1, further comprising a hood mounted to said positioning means above and at least partially covering said cooling system, said engine and said transmission, said hood being narrower adjacent to said operator enclosure than around said engine.

4. The work vehicle of claim 3, wherein said hood encloses a space above said transmission and behind said engine.

5. The work vehicle of claim 2, further comprising a fuel tank for said engine mounted substantially behind said transmission and beneath said operator enclosure.

6. The work vehicle of claim 2, wherein said positioning means comprises a structural oil pan mounted above said axle, said engine being mounted to a top portion of said oil pan, said cooling system being mounted to a first end of said oil pan and said transmission being mounted to a second end of said oil pan.

7. The work vehicle of claim 6, wherein said oil pan and said transmission is of a width allowing an operator seated in said operator enclosure to see the ground between said tires.

8. The work vehicle of claim 7, wherein said oil pan, engine and transmission are configured to form a recess adjacent to each said tire into which said tire can pivot during steering.

9. The work vehicle of claim 2, further comprising an additional axle having tires at either end of said additional axle, said additional axle being mounted substantially beneath and behind said operator enclosure, and fenders mounted adjacent to said operator enclosure and said tires on said additional axle, wherein the width of said operator enclosure and said fenders is at least as great as the width of said additional axle and tires.

* * * * *

UNITED STATES PATENT AND TRADEMARK OFFICE
CERTIFICATE OF CORRECTION

PATENT NO. : 5,152,364

DATED : 6 October 1992

INVENTOR(S) : Terrill W. Woods and Lyle R. Madson

It is certified that error appears in the above-identified patent and that said Letters Patent is hereby corrected as shown below:

In column 4, line 16, delete "define" and insert -- defined --.

Signed and Sealed this

Twenty-eighth Day of September, 1993

*Attest:*

BRUCE LEHMAN

*Attesting Officer*　　　*Commissioner of Patents and Trademarks*